United States Patent [19]
Chung et al.

[11] Patent Number: 5,745,655
[45] Date of Patent: Apr. 28, 1998

[54] CHAOTIC NEURAL CIRCUIT AND CHAOTIC NEURAL NETWORK USING THE SAME

[75] Inventors: Ho-sun Chung, Sooseong-gu Taegu; Ik-soo Lee, Kyungsangbuk-do, both of Rep. of Korea

[73] Assignee: Gold Star Electron Co., Ltd., Chungcheongbuk-Do, Rep. of Korea

[21] Appl. No.: 375,473

[22] Filed: Jan. 19, 1995

[30] Foreign Application Priority Data

Feb. 2, 1994 [KR] Rep. of Korea .................. 94-1915

[51] Int. Cl.[6] ............................................. G06F 15/18
[52] U.S. Cl. ............................................. 395/24; 395/27
[58] Field of Search ............................................. 395/24, 27

[56] References Cited

U.S. PATENT DOCUMENTS

| | | | |
|---|---|---|---|
| 5,235,672 | 8/1993 | Carson | 395/24 |
| 5,448,682 | 9/1995 | Chung et al. | 395/27 |
| 5,506,795 | 4/1996 | Yamakawa | 364/717 |

OTHER PUBLICATIONS

Shimizu et al., "An Electronic Circuit Model of Chaotic Neural Networks," Transactions of the Institute of Electronics Information and Communication Engineers, vol. J73A, issure 3, pp. 495–508, Tokyo, Mar. 1990.

Adachi et al., "Pattern Dynamics of Chaotic Neural Networks with Nearest Neighbor Couplings," Circuits and Systems, 1991 IEEE International Symposium, Apr. 1991.

Pham et al., "CMOS Digital Retina Chip with Multo–bit Neurons for Image Coding," Circuits and Systems, 1993 IEEE International Symposium, May 1993.

*Primary Examiner*—David K. Moore
*Assistant Examiner*—Jeffrey S. Smith
*Attorney, Agent, or Firm*—Rothwell, Figg, Ernst & Kurz

[57] ABSTRACT

A mapping circuit includes a linear circuit for outputting a signal which is linearly changed with respect to its input, a non-linear circuit for outputting a signal which is non-linearly changed with respect to its input, and an adder for summing the output signals of the linear and non-linear circuits and an external input signal. A chaotic neuron circuit using the mapping circuit has a simple structure and more precise chaos characteristics. A chaotic neural network can thus be formed by the serial and/or parallel interconnection of a plurality of chaotic neuron circuits, wherein the weight of each neuron is controlled.

10 Claims, 8 Drawing Sheets

CHAOTIC NEURAL CIRCUIT AND CHAOTIC NEURAL NETWORK USING THE SAME

BACKGROUND OF THE INVENTION

The present invention relates to chaotic neural networks, and more particularly, to a mapping circuit and a chaotic neuron circuit and network and using the same.

A cerebral nervous system, e.g., the human brain, shows a chaos phenomenon with a macroscopic dynamic interpretation, together with various other internal functions; that is, analog and non-linear properties, parallel-distributed data processing, one output from a large amount of input, learning, and associative memory. Now, with brain activity measurement made possible through such means as an electro-encephalogram (EEG), a magneto-encephalogram (MEG) and membrane potential determination, the structural role and data processing functions of the brain can be investigated. Therefore, research into the role of the chaotic response within the cerebral nervous system and the possibility for technical application has been proceeded. As one technical application, the connection between chaos theory and neural networks has been actively researched.

The cerebral nervous system is composed of neurons performing many various functions. Also, in the aspect of non-linear kinetics, a real neuron shows various response characteristics, that is, a fixed point, limited cycles, bifurcation, and the chaos phenomenon. However, according to a conventional neuron model, the neuron can be simplified by excluding submissive and other complex characteristics.

Neural network theory has been around since 1960. Recently, however, successfully applied cases have been made in adaptive control, pattern recognition and parallel-distributed data processing. On the other hand, neural network theory has many basic problems caused by the simplified modeling of the neuron. The following equations are the examples of digital and analog neuron models.

$$x_i = f\left[ \sum_{j=0}^{N} w_{ij}a_j - \theta_i \right] \quad (1)$$

$$y_i\left( \frac{dy_i(t)}{dt} \right) = -y_i(t) + \left[ \sum_{j=0}^{N} w_{ij}X_j(t) + \theta_j \right] + a_i(t) \quad (2)$$

$$x_i(t) = f[y_i(t)] \quad (3)$$

Chaos phenomenon is widely shown in the Hodgkin-Huxley equation and the huge axon of a squid. Also, much evidence for the existence of the chaos phenomenon in the cerebral nervous system has been published. The present invention introduces the chaotic neuron model which exhibits the chaotic response characteristic of a neuron by exerting the neural output of the one chaotic neuron on the input of the next. Here, the chaotic neuron model is expressed as the following differential equations.

$$x(t+1) = f\left[ a(t) - \alpha \sum_{r=0}^{n} k^r g\{x(t-r)\} - \theta \right] \quad (4)$$

$$f(y) = \frac{1}{1+\exp\left( \frac{-y}{\epsilon} \right)} \quad (5)$$

where x(t+1) is the output of a neuron at a discrete time t+1, f(t) is an output function of a non-linear neuron at time t, a(t) is the magnitude of an external input stimulus at time t, g is a function showing the relationship between the neural output and refractory magnitude, k is a refractory attenuation constant (0≦k≦1), α is a refractory magnitude constant (α>0), and θ is the threshold of the internal neuron.

Supposing that the internal state of a neuron is y(t+1), the differential of equation (4) is solved and summed. The result is as follows.

$$y(t+1) = a(t) - \alpha \sum_{r=0}^{n} k^r g\{x(t-r)\} - \theta \quad (6)$$

$$y(t+1) = ky(t) - \alpha f[y(t)] + a(t) \quad (7)$$

$$x(t+1) = f[y(t+1)] \quad (8)$$

Figure 1:
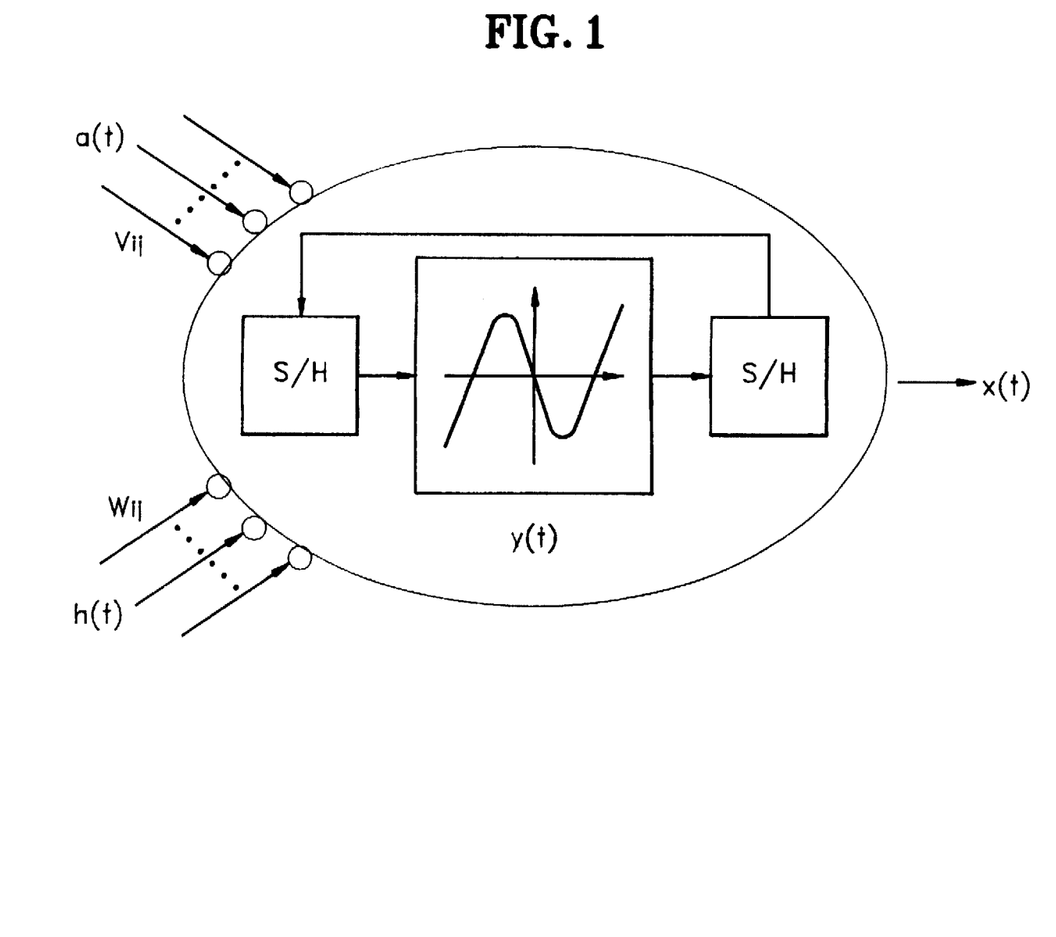
FIG. 1 shows a chaotic neuron model.

As shown in equation (7), the overall internal characteristic is composed of a linear part ky(t), a non-linear part αf[y(t+1)], an external input a(t). Also, the above chaotic neuron can be used to compose a weighted neural network. The construction of the "i"th chaotic neuron is shown in FIG. 1 and the equation of the construction is as follows.

$$x_i(t+1) = f\left[ \sum_{i=1}^{M} W_{ij} \sum_{r=0}^{t} k^r h_j\{x_j(t-r)\} + \sum_{j=1}^{N} V_{ij} \sum_{r=0}^{t} k^r a_j(t-r) - \alpha \sum_{r=0}^{t} k^r g_j\{x_i(t-r)\} - \theta_i \right] \quad (9)$$

As shown in the above equation, the "i"th neuron is composed of an external pattern input a(t) and the feedback part of the neural external output and weights $w_{ij}$ and $v_{ij}$ are multiplied, thereby providing the overall external input of the "i"th neuron.

Figure 2:
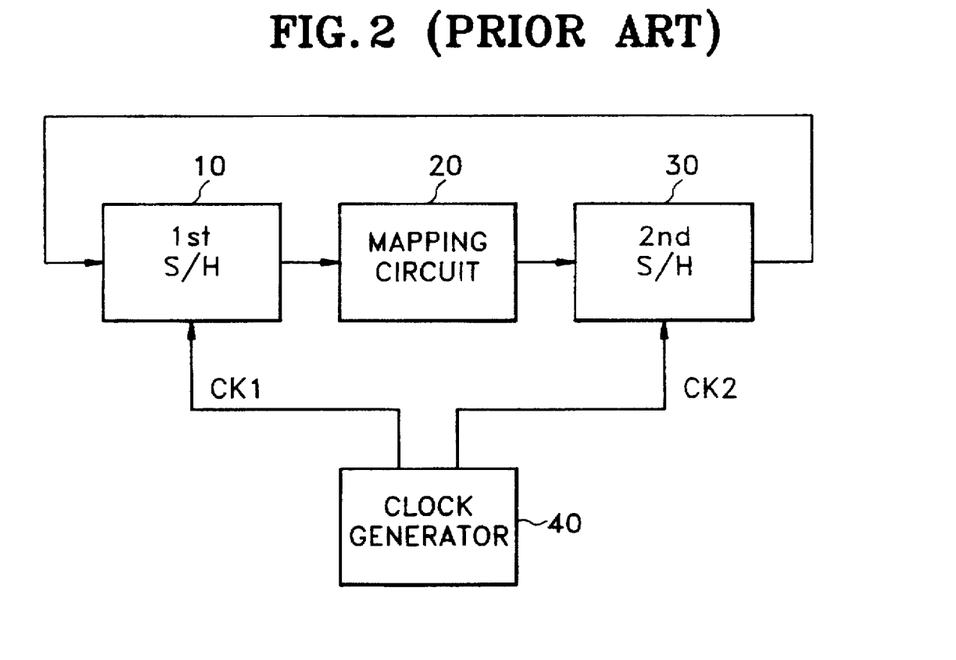
FIG. 2 is a block diagram of a conventional one-dimensional chaotic neuron circuit.

FIG. 2 is a block diagram for a conventional one-dimensional chaotic neuron circuit.

In FIG. 2, the chaotic neuron is composed of a first sample-and-hold (S/H) circuit 10 for sampling and holding an input signal in response to a clock signal CK1, a mapping circuit 20 for generating an output signal corresponding to the output of first sample-and-hold circuit 10, a second sample-and-hold circuit 30 for sampling and holding the output signal of mapping circuit 20 in response to a clock signal CK2, and a clock generator 40 for generating clock signals CK1 and CK2.

Figure 3:
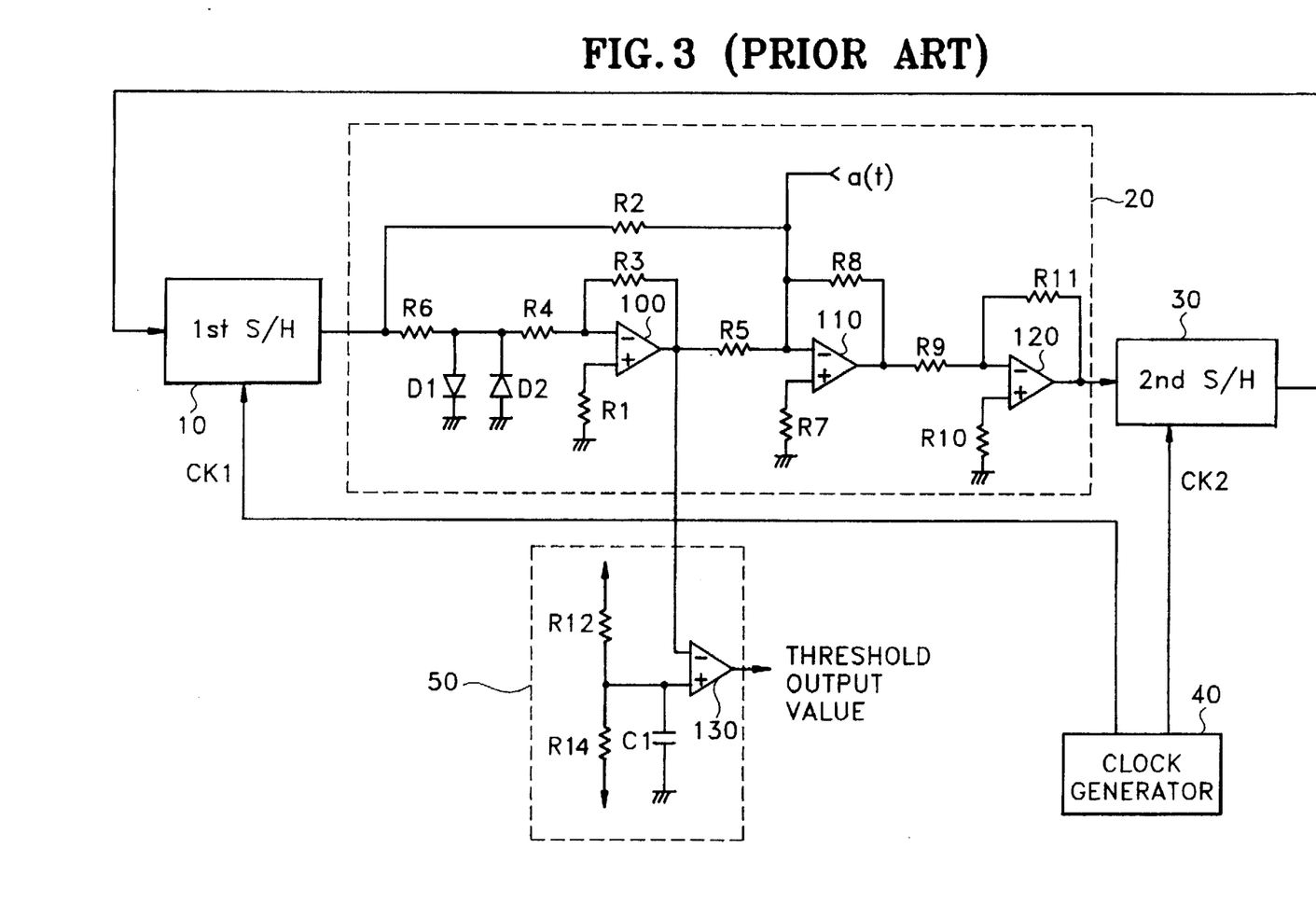
FIG. 3 is a detailed diagram of the chaotic neuron circuit shown in FIG. 2.

FIG. 3 is a detailed circuit diagram of the block diagram of the mapping circuit shown in FIG. 2.

In FIG. 3, mapping circuit 20 is composed of a resistor R6 one end of which is connected to the output of first sample-and-hold circuit 10, a diode D1 whose anode is connected to the other end of resistor R6 and whose cathode is connected to ground, a diode D2 whose cathode is connected to the other end of resistor R6 and whose anode is connected to ground, a resistor R4 one end of which is connected to the other end of resistor R6, an amplifier 100 whose inverting input is connected to the other end of resistor R4, a resistor R1 connected between the non-inverting input of amplifier 100 and ground, a resistor R3 connected between the output of amplifier 100 and its inverting input, a resistor R2 connected between the one end of resistor R6 and an external input a(t), a resistor R5 one end of which is connected to the output of amplifier 100, an amplifier 110 whose inverting input is connected to the other end of resistor R5, a resistor R7 connected between the non-inverting input of amplifier 110 and ground, a resistor R8 connected between the output of amplifier 110 and its inverting input, a resistor R9 one end of which is connected to the output of amplifier 110, an amplifier 120 whose inverting input is connected to the other end of resistor R9 and whose output is connected to second sample-and hold circuit 30, a resistor R10 connected between the non-inverting input of amplifier 120 and ground, and a resistor R11 connected between the output of amplifier 120 and its inverting input. Also, a threshold circuit 50 is composed of an amplifier 130 whose non-inverting input receives the voltage divided by resistors R12 and R14 connected in series between the predetermined voltages and whose inverting input receives the output signal of amplifier 100, and a capacitor C1 connected between the non-inverting input of amplifier 130 and ground.

The threshold circuit of the above construction is for providing a threshold value to another neuron of a chaotic neural network.

Figure 4:
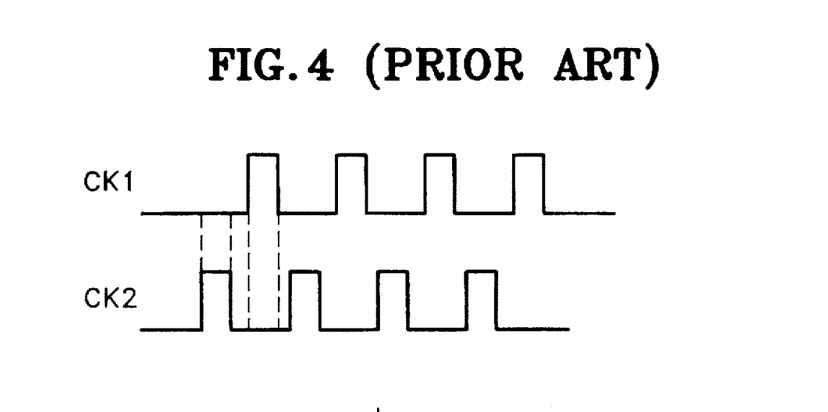
FIG. 4 is a diagram showing the timing of the clock signals output from the clock signal generator of the chaotic neuron circuit shown in FIG. 3.

FIG. 4 is a diagram showing the timing of clock signals CK1 and CK2 generated from clock generator 40. Here, it should be noted that clock signals CK1 and CK2 do not overlap each other.

First and second sample-and-hold circuits 10 and 30 sample the input signal during the high clock intervals and hold the signal during the low clock intervals. That is, due to the alternating characteristics of the low intervals of clock signals CK1 and CK2, the two sample-and-hold circuits alternately perform hold operations. If a hold voltage y(0) is output from first sample-and-hold circuit (10), a discrete voltage y(1) caused by voltage y(0) is output from the mapping circuit. Second sample-and-hold circuit 30 holds discrete voltage y(1) and outputs the voltage to first sample-and-hold circuit 10. Then, when first sample-and-hold circuit 10 holds y(1) and outputs the voltage to mapping circuit 20, a discrete voltage y(2) generated with respect to voltage y(1) is output from the mapping circuit. As described above, voltage y(t) is output from the mapping circuit, and as a result, voltage v(t+1) is obtained and the mapping process is repeated by the iteration of the clock signals. Supposing that g is an identical function, f is a logic function, and an input a is constant (e.g., a=1), the following equation is obtained.

$$y(t+1) = ky(t) - \alpha \left( \frac{1}{1 + \exp\left(\frac{-y}{\epsilon}\right)} \right) + a \quad (10)$$

That is, the mapping circuit is obtained by taking y(t) and y(t+1) as input and output voltages, respectively, and constructing a circuit which has the characteristics of each of the three terms of equation (10) and adding the three terms. Here, the first term (the product of y(t) and a constant k) is simply a linear amplifier having a gain of k and an input of y(t), and the third term (a) represents a DC voltage for cases where the input is constant. Even though the second term is complex, the circuit construction simply uses the characteristics of a diode limiter.

Figure 5:
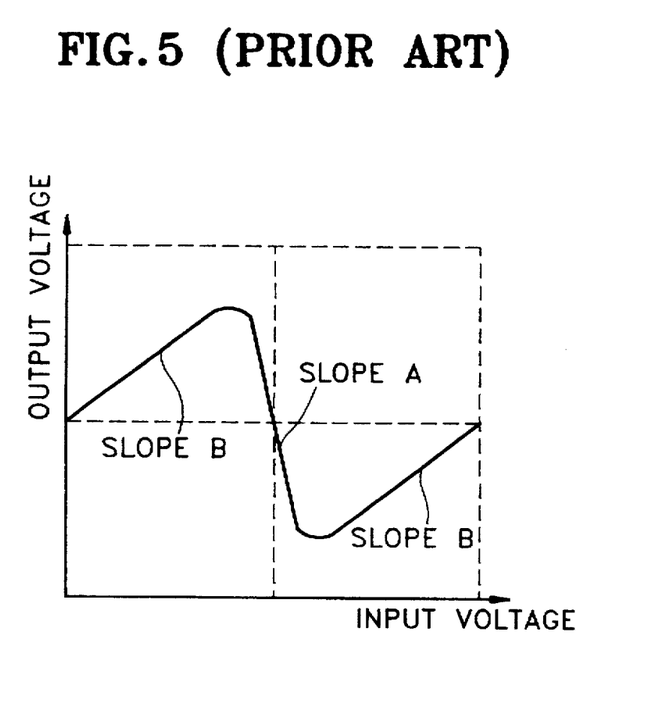
FIG. 5 is a graph showing the transfer characteristic of the output signal with respect to input signal of the mapping circuit of FIG. 3.

FIG. 5 shows the input-versus-output transfer characteristic curve of mapping circuit 20. Here, slopes A and B can be controlled by varying the resistances of the mapping circuit of FIG. 3 and are expressed by the following equations (11) and (12).

$$\text{slope } B = \frac{R1}{R2} \quad (11)$$

$$\text{slope } A = \frac{R1}{R2} - \frac{R1 \times R2}{R5(R4 + R6)} \quad (12)$$

That is, according to the circuit shown in FIG. 3, the amplifier 100 and diodes D1 and D2 of the mapping circuit make it difficult to obtain the exact logic function. Also, the threshold circuit 50, being composed of an amplifier (130), complicates the circuit constitution.

SUMMARY OF THE INVENTION

It is an object of the present invention to provide a mapping circuit having a simple construction.

It is another object of the present invention to provide a chaotic neuron circuit using the mapping circuit.

To achieve the above first object of the present invention, there is provided a mapping circuit comprising: linear means for outputting an output signal which is linearly changed with respect to the input; non-linear means for outputting an output signal which is non-linearly changed with respect to the input; and a first adder for summing the output signals of the linear and non-linear means and an external input signal.

To achieve the above second object of the present invention, there is provided a chaotic neuron circuit using the above mapping circuit, comprising: first sample-and-hold means for sampling and holding the input in response to a first clock signal; linear means for generating an output signal having a linear characteristic with respect to the output of the sample-and-hold means; non-linear means for generating an output signal having a non-linear characteristic with respect to the output of the sample-and-hold means; an adder for summing the output signals of the linear and non-linear means; second sample-and-hold means for sampling and holding the output from the adder in response to a second clock signal and outputting the result to the input of the first sample-and-hold means; and a clock signal generator for generating the first and second clock signals.

Various chaotic neural networks can be constituted by connecting a plurality of chaotic neurons having the above construction and controlling the weight of each neuron.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 6:
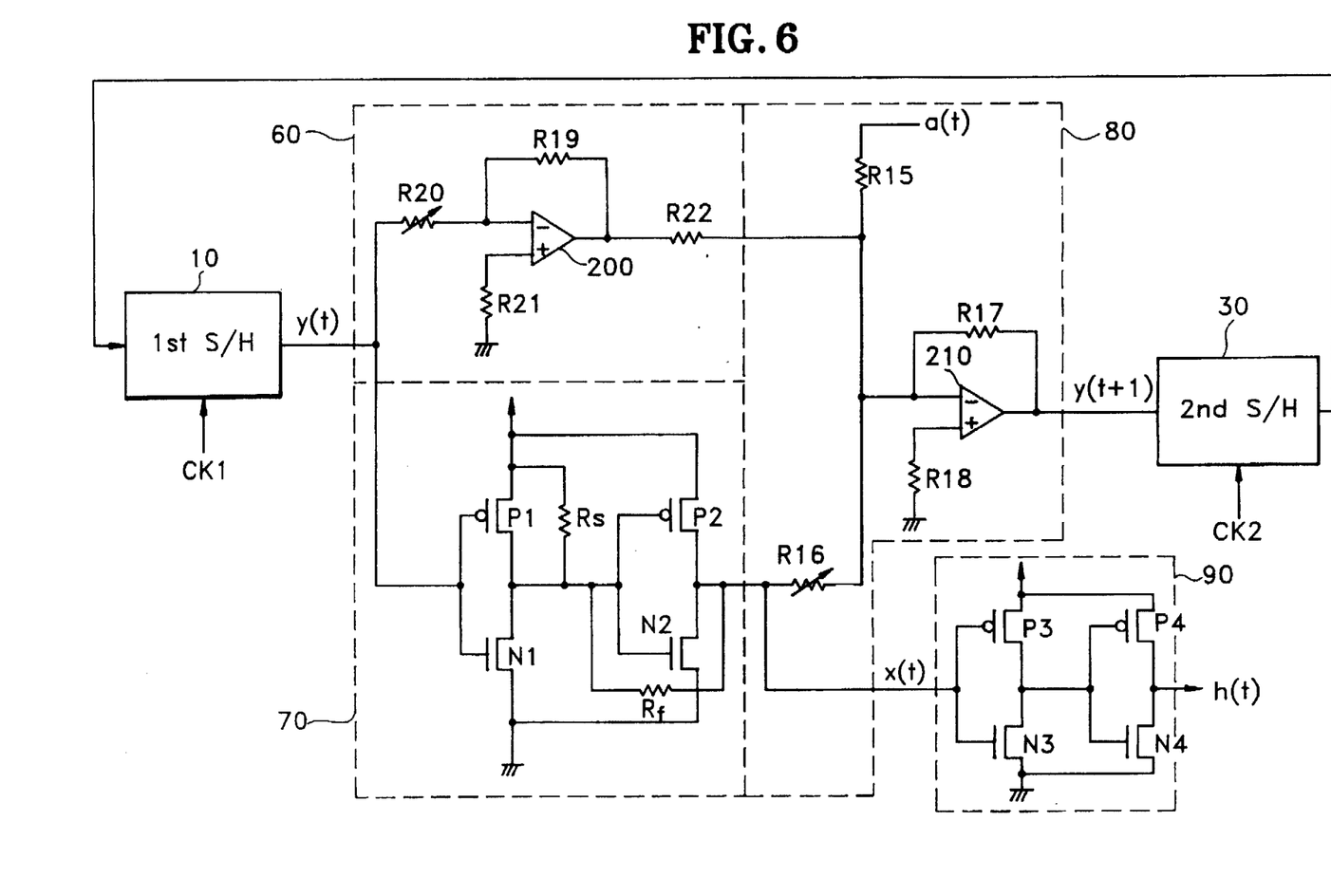
FIG. 6 is a block diagram of the chaotic neuron circuit according to the present invention, and a detailed circuit diagram of the mapping circuit according to the present invention.

Referring to FIG. 6, the mapping circuit of the present invention comprises a linear circuit 60 for generating an output voltage having a linear characteristic with respect to the input, a non-linear circuit 70 for generating an output voltage having a non-linear characteristic with respect to the input, and an adder 80 for summing the output voltages of the linear and non-linear circuits 60 and 70 with that of an external input a(t).

Linear circuit 60 comprises a resistor R20 one end of which is applied with the output of first sample-and-hold circuit 10, an amplifier 200 whose inverting input is connected to the other end of resistor R20, a resistor R19 connected between the output of amplifier 200 and its inverting input, a resistor R21 connected between the non-inverting input of amplifier 200 and ground, and a resistor R22 one end of which is connected to the output of amplifier 200 and the other end being connected to one input of adder 80.

Non-linear circuit 70 comprises a PMOS transistor P1 whose gate is applied with the output signal of first sample-and-hold circuit 10 and whose source is connected to a power voltage, an NMOS transistor N1 whose gate is also applied with the output signal of first sample-and-hold circuit 10, whose source is connected to ground and whose drain is connected to the drain of PMOS transistor P1, a resistor Rs connected between the source and drain of PMOS transistor P1, a PMOS transistor P2 whose gate is connected to the drain of PMOS transistor P1 and whose source is connected to the power voltage, an NMOS transistor N2 whose gate is connected to the drain of PMOS transistor P1, whose drain is connected to the drain of PMOS transistor P2 and whose source is connected to ground, for output to adder 80, and a resistor Rf connected between the drains of PMOS transistors P1 and P2.

Adder 80 comprises an amplifier 210 whose inverting input is connected to the outputs of linear circuit 60 and non-linear circuit 70 and whose output is connected to second sample-and-hold circuit 30, a resistor R15 one end of which is applied with external input a(t) and the other end being connected to the inverting input of amplifier 210, a resistor R16 one end of which is connected to the output of non-linear circuit 70 and the other end also being connected to the inverting input of amplifier 210, a resistor R17 connected between the output of amplifier 210 and its inverting input, and a resistor R18 connected between the non-inverting input of amplifier 210 and ground.

A threshold circuit 90 comprises a PMOS transistor P3 whose gate is connected to the output of linear circuit 60 and whose source is connected to the power voltage, an NMOS transistor N3 whose gate is connected to the gate of PMOS transistor P3, whose drain is connected to the drain of PMOS transistor P3 and whose source is connected to ground, a PMOS transistor P4 whose gate is connected to the drain of PMOS transistor P3 and whose source is connected to the power voltage, and an NMOS transistor N4 whose gate is connected to the drain of PMOS transistor P3, whose drain is connected to that of PMOS transistor P4 and whose source is connected to ground.

The mapping circuit of the present invention has transfer characteristics y(t) and y(t+1) and is formed by combining linear and non-linear outputs. That is, the mapping circuit is constituted by summing two functions having linear and non-linear characteristics, respectively. The linear circuit is made using a simple amplifier stage and the non-linear circuit is made using two CMOS inverters and a feedback resistor.

Figure 7:
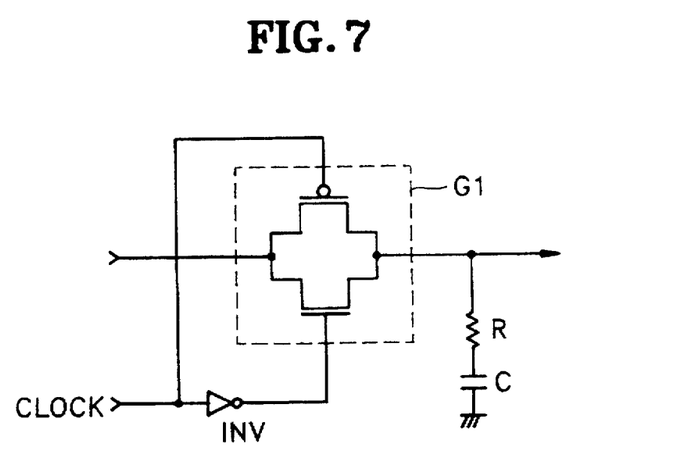
FIG. 7 is a circuit diagram of the sample-and-hold circuit of the chaotic neuron circuit according to the present invention.

FIG. 7 is a circuit diagram of either sample-and-hold circuit of the chaotic neuron circuit according to the present invention. Each sample-and-hold circuit comprises an inverter INV for receiving and inverting a clock signal (CK1 or CK2), a CMOS transmission gate G1 for transmitting the input signal with respect to the clock signal, and a resistor R and a capacitor C connected in series between the output of CMOS transmission gate G1 and ground. Here, the circuit outputs the input signal (samples) when the clock signal is low and blocks the input signal (holds) when the clock signal is high.

Figure 8A:
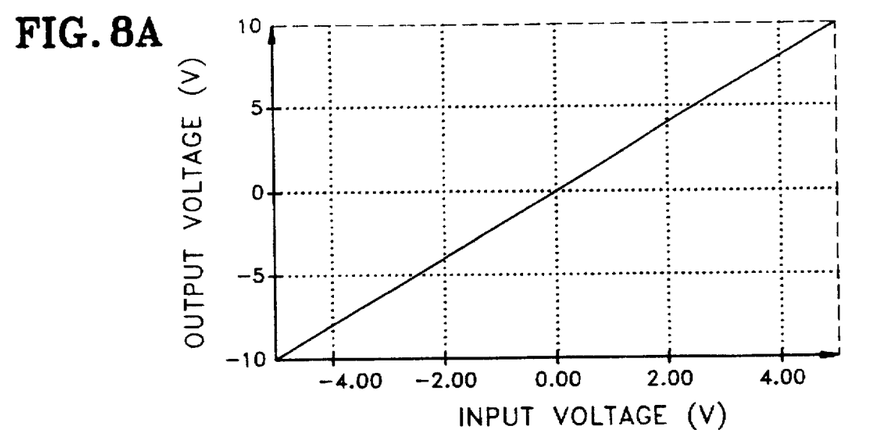
FIGS. 8A–8C are graphs showing transfer characteristics of the output voltage with respect to the input voltage, at various points of the mapping circuit shown in FIG. 6.
Figure 8B:
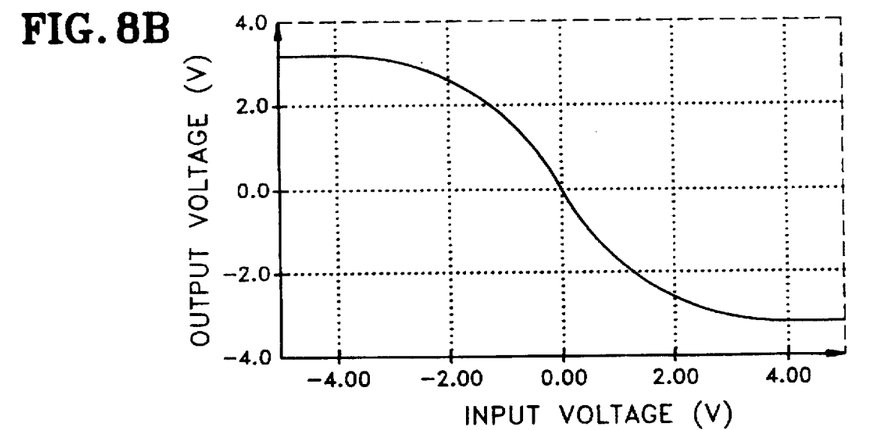
Figure 8C:
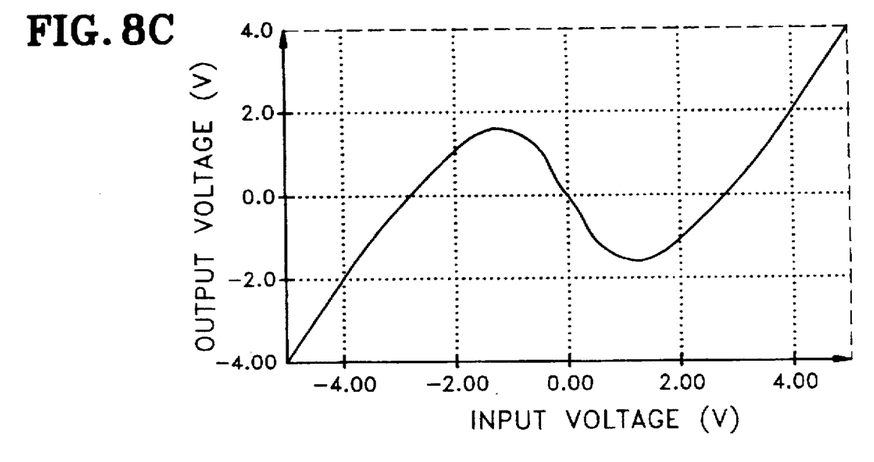

FIGS. 8A–8C show the transfer characteristics of the output voltage with respect to the input voltage, at various points of the mapping circuit shown in FIG. 6, wherein FIG. 8A is the output of linear circuit 60, FIG. 8B is the output of non-linear circuit 70, and FIG. 8C is the output of adder 80. Here, the external input a(t) is applied through resistor R15 to the inverting input of amplifier 210, to thereby be summed with the linear and non-linear outputs.

According to the present invention, the mapping circuit parameters, that is, the refractory attenuation constant k and the refractory magnitude constant α, can be obtained with respect to the following equations.

$$k = \frac{R19}{R20} \times \frac{R21}{R22} \quad (13)$$

$$\alpha = \frac{R17}{R16} \quad (14)$$

Here, parameters k and α can be controlled by changing resistor R20 and resistor R16, respectively. Also, the slope ε of the non-linear function can be varied via resistor Rf.

Figure 9:
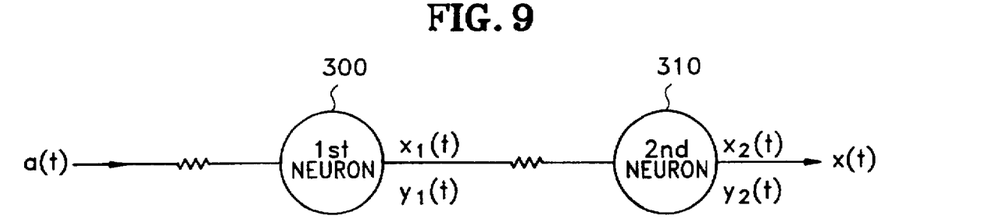
FIGS. 9–11 show configurations of the chaotic neural network according to the present invention.

FIG. 9 shows the serial-connection configuration of a plurality of chaotic neurons constituting a chaotic neural network according to the present invention. In FIG. 9, the chaotic neural network is constituted by connecting two chaotic neurons in series, and outputs an output signal x(t) by receiving an external input a(t). Here, the outputs of a first chaotic neuron 300 are $x_1(t)$ and $y_1(t)$, and the outputs of a second chaotic neuron 310 are $x_2(t)$ and $y_2(t)$. In the above constitution, the resistances between each neuron represent a connecting weight.

Figure 10:
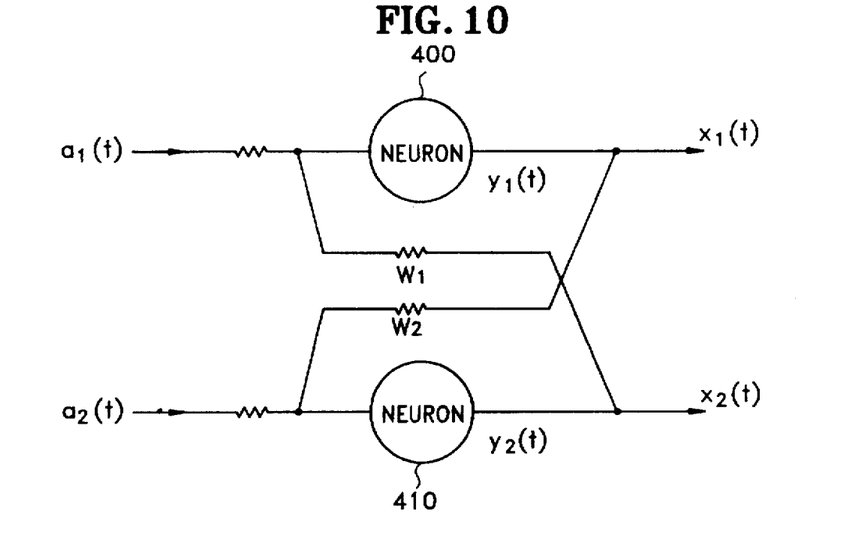

FIG. 10 shows the parallel-connection configuration of a plurality of chaotic neurons constituting a chaotic neural network according to the present invention. In FIG. 10, the chaotic neural network is constituted by two chaotic neurons 400 and 410 connected in parallel, which output two pairs of output signal $x_1(t)$ & $y_1(t)$ and $x_2(t)$ & $y_2(t)$ by receiving input signals $a_1(t)$ and $a_2(t)$, respectively. Here, Wi represents the connecting weight for connecting input signal $a_1(t)$ and the output of a chaotic neuron 410, and W2 represents the connecting weight for connecting input signal $a_2(t)$ and the output of a chaotic neuron 400.

Figure 11:
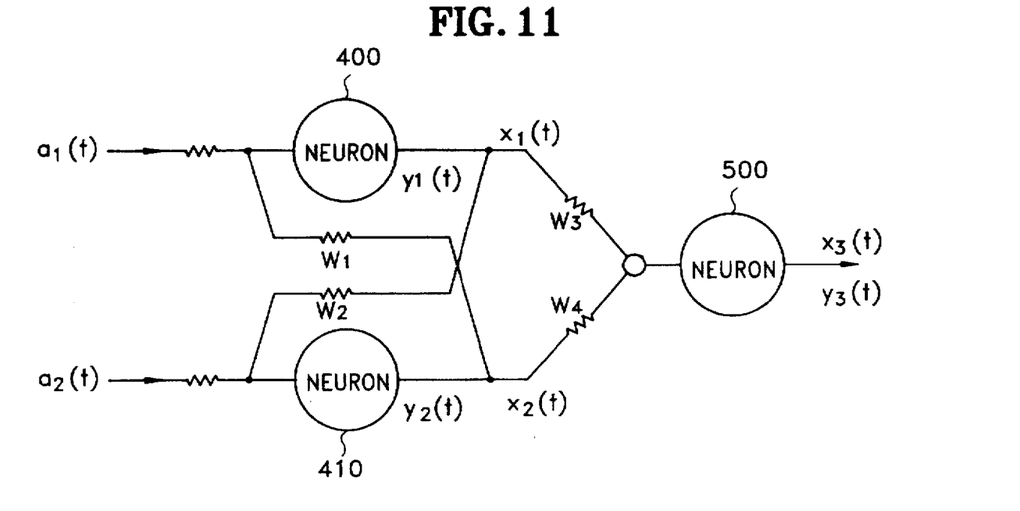

FIG. 11 shows a serial-parallel configuration of the chaotic neural network according to the present invention. In FIG. 11, weights W3 and W4 are connected in series to the outputs of the chaotic neurons 400 and 410 shown in FIG. 10, respectively, and the output signal passes through the weights to a third chaotic neural network 500. This chaotic neural network outputs signals $x_3(t)$ and $y_3(t)$.

A dynamical characteristic can be obtained by properly controlling each weight, as shown in FIGS. 9, 10 and 11, and a discrete characteristic can be obtained by synchronizing the clocks of each neuron.

Therefore, the mapping circuit and the chaotic neuron circuit and network using the same according to the present invention have the following merits: first, circuit parameters can be varied independently; second, the circuit constitution of the chaotic neural network according to the present invention is simple since the sample-and-hold circuit thereof is formed using a CMOS transmission gate and an RC network; third, the output function of a chaotic neural network can be easily varied by a feedback resistor; and fourth, since the constitution is formed by using a simple CMOS inverter without amplifier, the constitution is simple and the chip area can be reduced during integration.

What is claimed is:

1. A chaotic neural circuit for implementing a chaotic neuron in which a previous output of said neuron influences an external input signal at a current discrete time so that said neuron exhibits a chaotic response characteristic as an electronic circuit said chaotic neural circuit comprising:

linear means comprising an amplifier for amplifying an input signal linearly and for outputting the amplified input signal and a variable resistance whose first end receives said input signal and whose second end is connected to an input port of said amplifier for varying a gain of said amplifier, for linearly varying said input signal received by said first end of said variable resistance and outputting an output signal through an output port of said amplifier;

non-linear means comprising two inverters and a feedback variable resistance connected between output ports of said two inverters for grading a slope of an output function of a non-linear neuron, for non-linearly varying said input signal which is input to an input port of one of said two inverters and outputting an output signal through an output port of the other one of said two inverters; and an adder for adding output signals of said linear means and non-linear means to said external input signal.

2. A chaotic neural circuit as claimed in claim 1, wherein said linear means comprises:

a first resistance one end of which receives an input signal;

first amplifying means whose inverting input is connected to the other end of said first resistance;

a second resistance connected between a non-inverting input of said first amplifying means and ground; and a third resistance connected between the output and inverting input of said first amplifying means.

3. A chaotic neural circuit as claimed in claim 1, wherein said non-linear means comprises:

a first PMOS transistor whose gate is applied with an input signal and whose source is connected to a power voltage;

a first NMOS transistor whose drain is connected to a drain of said first PMOS transistor, whose source is connected to ground and whose gate is applied with the input signal;

a fourth resistance connected between the power voltage and the drain of said first PMOS transistor;

a second PMOS transistor whose gate is connected to the drain of said first PMOS transistor and whose source is connected to the power voltage;

a second NMOS transistor whose drain is connected to that of said first PMOS transistor, whose source is connected to ground and whose gate is applied with the input signal, and from which an output signal is derived; and a fifth resistance connected between the drains of said first and second PMOS transistors.

4. A chaotic neural circuit as claimed in claim 1, further comprising:

sample-and-hold means responding to a clock signal, for holding a signal output from said adder for a predetermined time and outputting the same to said linear means and said non-linear means as said predetermined input signal at a next discrete time.

5. A chaotic neuron circuit comprising:

first sample-and-hold means for sampling and holding the input in response to a first clock signal;

linear means for generating an output signal having a linear characteristic with respect to the output of said first sample-and-hold means;

non-linear means for generating an output signal having a non-linear characteristic with respect to the output of said first sample-and-hold means;

an adder for summing the output signals of said linear and non-linear means;

second sample-and-hold means for sampling and holding the output from said adder in response to a second clock signal and outputting the result to the input of said first sample-and-hold means; and clock signal generating means for generating said first and second clock signals;

wherein said first sample-and-hold means comprises:

an inverter for receiving and inverting the first clock signal;

a CMOS transmission gate for transmitting the input signal in response to the first clock signal; and a resistance and capacitance connected in series between an output of said CMOS transmission gate and ground.

6. A chaotic neuron circuit comprising:

first sample-and-hold means for sampling and holding the input in response to a first clock signal;

linear means for generating an output signal having a linear characteristic with respect to the output of said first sample-and-hold means;

non-linear means for generating an output signal having a non-linear characteristic with respect to the output of said first sample-and-hold means:

an adder for summing the output signals of said linear and non-linear means;

second sample-and-hold means for sampling and holding the output from said adder in response to a second clock signal and outputting the result to the input of said first sample-and-hold means: and clock signal generating means for generating said first and second clock signals;

wherein said second sample-and-hold means comprises:

an inverter for receiving and inverting the second clock signal;

a CMOS transmission gate for transmitting the input signal in response to the second clock signal; and a resistance and capacitance connected in series between an output of said CMOS transmission gate and ground.

7. A chaotic neural network including a predetermined number of chaotic neural circuits, said chaotic neural circuits being connected in series said chaotic neural network comprising weighting means for weighting an input signal to each chaotic neural circuit said each chaotic neural circuit for implementing a chaotic neuron in which a previous neuron output influences on an external input signal at a current discrete time so that the neuron exhibits a chaotic response characteristics, wherein each of said chaotic neural circuits comprises:

linear means comprising an amplifier for amplifying an input signal linearly and for outputting the amplified input signal and a variable resistance whose first end receives said input signal and whose second end is connected to an input port of said amplifier for varying a gain of said amplifier, for linearly varying said input signal received by said first end of said variable resistance and outputting an output signal through an output port of said amplifier;

non-linear means comprising two inverters and a feedback variable resistance connected between output ports of said two inverters for grading a slope of an output function of a non-linear neuron, for non-linearly varying said input signal which is input to an input port of one of said two inverters and outputting an output signal through an output port of the other one of said two inverters; and an adder for adding output signals of said linear means and non-linear means to said external input signal; and sample-and-hold means responding to a clock signal, for holding a signal output from said adder for a predetermined time and outputting the same to said linear means and said non-linear means as said input signal at the next discrete time.

8. A chaotic neural network including a predetermined number of chaotic neural circuits, said chaotic neural circuits being connected in parallel, and said chaotic neural network comprising weighting means for weighting a signal input to each chaotic neural circuit, said each chaotic neural circuit for implementing a chaotic neuron in which a previous neuron output influences on an external input signal at a current discrete time so that the neuron exhibits a chaotic response characteristics, wherein each of said chaotic neural circuits comprises:

linear means comprising an amplifier for amplifying an input signal linearly and for outputting the amplified input signal and a variable resistance whose first end receives said input signal and whose second end is connected to an input port of said amplifier for varying a gain of said amplifier, for linearly varying said input signal received by said first end of said variable resistance and outputting an output signal through an output port of said amplifier:

non-linear means comprising two inverters and a feedback variable resistance connected between output ports of said two inverters for grading a slope of an output function of a non-linear neuron for non-linearly varying said input signal which is input to an input port of one of said two inverters and outputting an output signal through an output port of the other one of said two inverters; and an adder for adding output signals of said linear means and non-linear means to said external input signal; and sample-and-hold means responding to a clock signal, for holding a signal output from said adder for a predetermined time and outputting the same to said linear means and said non-linear means as said input signal at the next discrete time.

9. A chaotic neural network including a predetermined number of chaotic neural circuits said chaotic neural circuits being connected in series and in parallel, and said chaotic neural network comprising weighting means for weighting a signal input to each chaotic neural circuit, said each chaotic neural circuit for implementing a chaotic neuron in which a previous neuron output influences on an external input signal at a current discrete time so that the neuron exhibits a chaotic response characteristics, wherein each of said chaotic neural circuits comprises:

linear means comprising an amplifier for amplifying an input signal linearly and for outputting the amplified input signal and a variable resistance whose first end receives said input signal and whose second end is connected to an input port of said amplifier for varying a gain of said amplifier for linearly varying said input signal received by said first end of said variable resistance and outputting an output signal through an output port of said amplifier:

non-linear means comprising two inverters and a feedback variable resistance connected between output ports of said two inverters for grading a slope of an output function of a non-linear neuron for non-linearly varying said input signal which is input to an input port of one of said two inverters and outputting an output signal through an output port of the other one of said two inverters; and an adder for adding output signals of said linear means and non-linear means to said external input signal; and sample-and-hold means responding to a clock signal for holding a signal output from said adder for a predetermined time and outputting the same to said linear means and said non-linear means as said input signal at the next discrete time.

10. A chaotic neural circuit as claimed in claim 4, wherein said sample-and-hold means comprises:

an inverter for receiving and inverting the clock signal;

a CMOS transmission gate for transmitting the input signal in response to the clock signal; and a resistance and capacitance connected in series between an output of said CMOS transmission gate and ground.

* * * * *

UNITED STATES PATENT AND TRADEMARK OFFICE
CERTIFICATE OF CORRECTION

PATENT NO. : 5,745,655
DATED : April 28, 1998
INVENTOR(S) : Ho-sun Chung et al.

It is certified that error appears in the above-indentified patent and that said Letters Patent is hereby corrected as shown below:

On the title page: The first inventor, Ho-sun Chung, resides in -- Taegu -- not "Sooseong-gu Taegu";

In the Claims: Col. 7, line 37, "the output and" should be -- an output of said first amplifying means and --; Col. 10, line 7, after "circuits" (first occurrence) insert a comma; Col. 10, line 29, after "neuron" insert a comma.

Signed and Sealed this

Sixth Day of October, 1998

Attest:

BRUCE LEHMAN

Attesting Officer

Commissioner of Patents and Trademarks